June 20, 1967 T. J. SULLIVAN 3,326,202
ATMOSPHERIC TYPE WATER HEATING APPARATUS
Filed Sept. 17, 1965
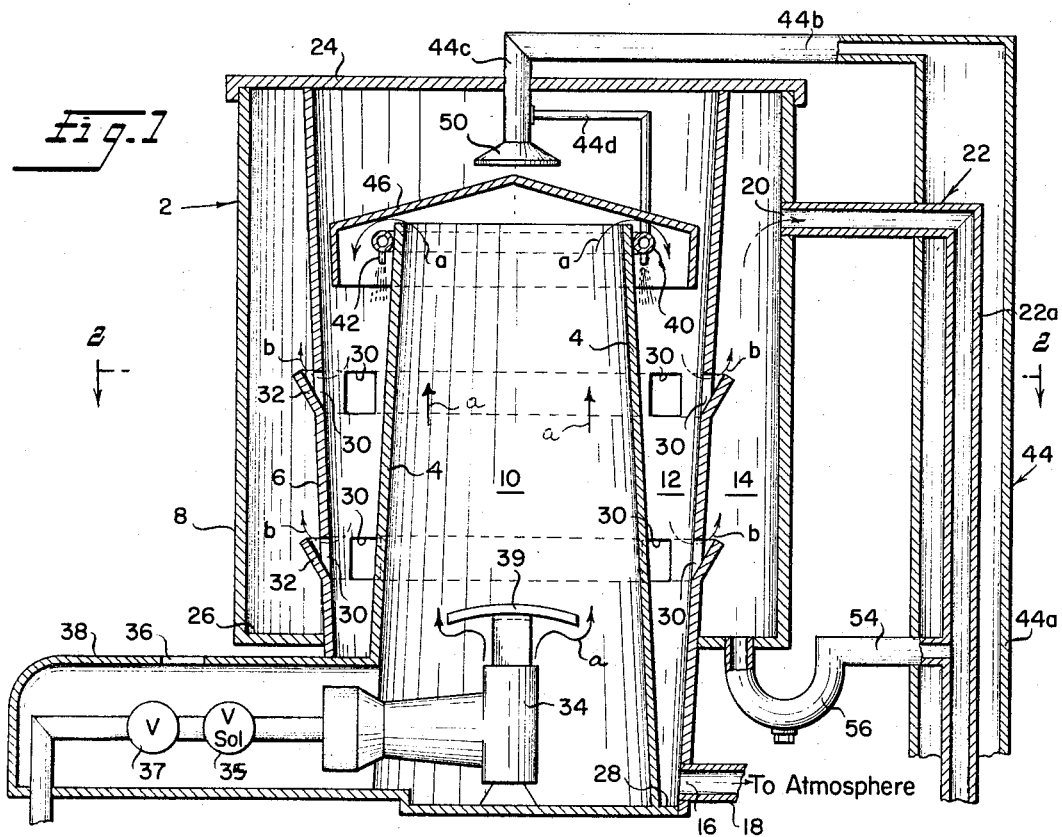
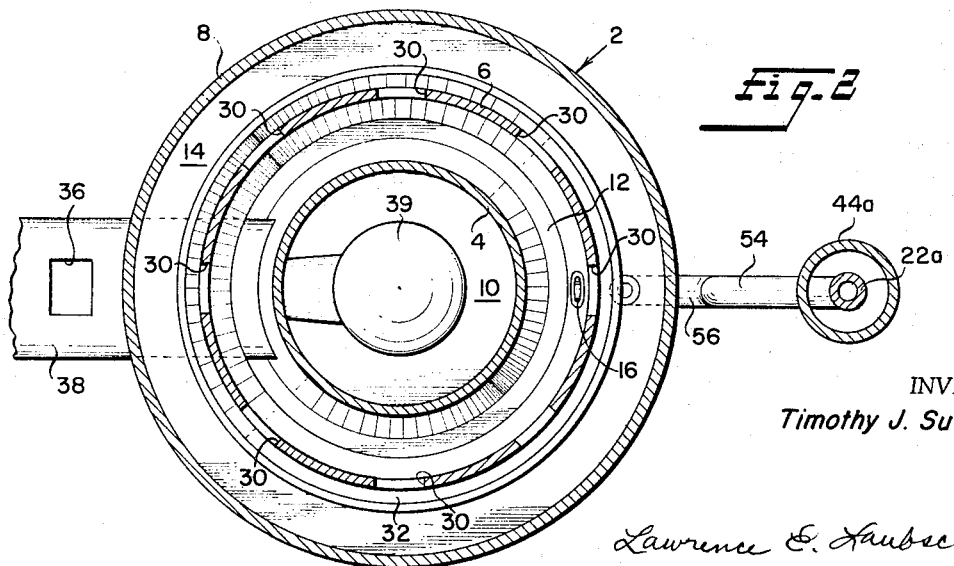
INVENTOR
Timothy J. Sullivan
Lawrence E. Laubscher
ATTORNEY

United States Patent Office 3,326,202
Patented June 20, 1967

3,326,202
ATMOSPHERIC TYPE WATER HEATING
APPARATUS
Timothy J. Sullivan, Butte, Mont., assignor to Sullivan Valve and Engineering Company, Butte, Mont., a corporation of Montana
Filed Sept. 17, 1965, Ser. No. 488,050
10 Claims. (Cl. 126—359)

This invention relates generally to an improved water heating and purifying apparatus of the direct-fired atmospheric type, and more particularly to water heating apparatus including a vertical annular water-to-steam flashing chamber arranged concentrically between a vertical combustion chamber and an annular steam discharge chamber.

In my prior copending U.S. patent application Ser. No. 441,729, filed Mar. 22, 1965, and entitled "Vertical Direct-Fired Water Heater," water heating apparatus is disclosed including an annular flashing chamber arranged concentrically about an inner combustion chamber. Hot combustion gases are conducted upwardly in said inner chamber and axially downwardly in said annular outer chamber. The water to be flashed to steam is sprayed axially downwardly in said outer chamber in interspersed relation with said hot combustion gases and is flashed into steam thereby.

The present invention relates to an improved apparatus over that previously described in the aforementioned patent application, said improved apparatus being particularly suitable, both economically and functionally, for such purposes as the removal of salt or impurities from water, for de-aerating boiler feed water, and the like.

The primary object of the present invention is to provide improved liquid treating apparatus including a vertical inner combustion chamber, an annular intermediate chamber arranged concentrically about, and in communication solely at its upper end with, said inner chamber, said intermediate chamber being vented to atmosphere at its lower end whereby combustion gases are drawn downwardly in said intermediate chamber, and an outer chamber arranged concentrically about said intermediate chamber and in communication with the central portion thereof via radial passages contained in the common wall therebetween. Means are provided for spraying an annular curtain of liquid downwardly in said intermediate chamber, whereby the liquid is vaporized by the hot gases in which it is interspersed. The vapors pass radially outwardly into said outer annular chamber and rise therein, whereupon the vapors are discharged from an outlet contained in the upper portion of said outer chamber.

A more specific object of the invention is to provide economical, large volume water heating apparatus including drain means for withdrawing from the bottom of the outer chamber the impurities removed from the liquid during the vaporization thereof. Gases contained in the liquid are liberated in the intermediate flashing chamber and are vented to atmosphere through the aforementioned vent means.

A more specific object of the invention is to provide water heating apparatus in which the steam removed from the outer chamber is condensed by the water supplied to apparatus. According to a further object, drain conduit means are provided that communicate at one end with the lower portion of said outer chamber and are connected at the other end with the condensing portion of the steam discharge conduit.

Still another object of the invention is to provide a safe, protective water heating apparatus in which the hot gas heating means are housed concentrically within a pair of concentric annular chambers, whereby the use of various types of heat sources (i.e., gas burner, electric heater, or nuclear energy means, for example) may be utilized without hazard to operating personnel or to the user.

Other objects and advantages of the invention will become apparent from a study of the following specification, when considered in conjunction with the accompanying drawing, in which:

FIGURE 1 is a sectional elevational view of the improved vertical direct-fired liquid heating apparatus; and FIGURE 2 is a sectional view taken along line 2—2 of FIGURE 1.

Referring now to the drawing, the apparatus of the subject invention includes a housing 2 containing first, second and third concentrically-arranged generally cylindrical walls 4, 6 and 8, respectively, defining inner, intermediate and outer chambers 10, 12 and 14, respectively. The first wall 4 is generally frustoconical and has at its upper end a smaller diameter than at its lower end. Similarly, the second wall 6 is frustoconical and has at its upper end a diameter that is larger than at its lower end. The housing contains also a combustion gas vent opening 16 affording communication between the lower portion of intermediate chamber 12 and an atmospheric vent conduit 18, and a vapor outlet 20 that affords communication between the upper portion of outer chamber 14 and a vapor discharge conduit 22. The upper end of the first wall 4 terminates at a lower elevation than that of the second wall 6, and the upper ends of walls 6 and 8 have the same elevation and support, in fluid tight relation, as the removable housing cover 24. Consequently the cover 24 prevents communication between the upper ends of chambers 12 and 14.

The bottom wall 26 of the outer chamber 14 has a higher elevation than the bottom wall 28 of the intermediate chamber 12. The second wall 6 contains a plurality of vertically spaced series of circumferentially spaced through passages 30 contained in horizontal planes, respectively, which passages afford communication between the central portion of intermediate chamber 12 and the lower portion of outer chamber 14. Mounted on the outer surface of the second wall 6 about each series of passages 30 is an upwardly divergent truncated conical deflector 32, the purpose of which will be described below.

Mounted in the bottom of the inner chamber 10 is a burner 34 to which fuel is supplied via manual control valve 37 and solenoid valve 35. Deflector 39 is associated with the burner 34 to deflect radially outwardly the flame and combustion gases generated by the burner. Air is supplied to the lower end of the inner chamber 10 via openings 36 in air supply conduit 38.

Mounted in intermediate chamber 12 adjacent the upper end of the first wall 4 is an annular water pipe 40 having a plurality of downwardly directed nozzles 42 for directing an annular liquid spray curtain downwardly in intermediate chamber 12. Liquid (specifically, water) is supplied to pipe 40 from water conduit 44 having a first vertical portion 44a, a horizontal portion 44b, a second vertical portion 44c and a branch line 44d.

Mounted above and spaced from the open upper end of the first wall 4 by suitable support means, not shown, is a downwardly divergent conical baffle 46 having at its lower end a diameter that is greater than the outer diameter of the opposed portion of the first wall 4, and less than the inner diameter of the opposed portion of the second wall 6. The second vertical portion 44c of the water supply conduit 44 terminates in a spray nozzle 50 for spraying liquid upon the upper surface of the conical baffle 46. Preferably, the lower surface of baffle 46 and the inner surface of the first wall 4 are lined with a flame resistant material (such as a ceramic liner, or the like), not shown.

As shown in FIGURE 1, the vapor discharge conduit 22 includes a vertical portion 22a in heat exchange relationship with the liquid in water supply conduit portion 44a. A condensation drain conduit 54 containing a trap 56 provides communication between the lower portion of the outer chamber 12 and the vertical portion 22a of the vapor discharge conduit 22.

Operation

Assuming that valves 35 and 37 are open and that the burner flame is established, the hot combustion gases flow from the burner to the atmospheric vent 18 as shown by the solid arrows "a" in FIGURE 1. More specifically, the hot gases flow upwardly in inner chamber 10, are deflected radially outwardly into the upper portion of intermediate chamber 12 by the lower surface of conical baffle 46, and downwardly in intermediate chamber 12 toward the hot gas outlet 16. Water is supplied to annular pipe 40 via water conduit 44 and is sprayed downwardly in intermediate chamber 12 by the nozzles 42. Additionally, water is sprayed on the upper surface of baffle 46 to cool the same, and flows downwardly into the intermediate chamber via the annular space between the lower edge of the baffle and the inner surface of the second wall 6. This water introduced downwardly into intermediate chamber 12 is drawn downwardly and is flashed into steam by the downwardly travelling hot gases, whereupon the flashed steam flows radially outwardly (as shown by the broken arrows "b") into the outer chamber 14 via passages 30, is deflected upwardly by deflectors 32, flows upwardly in outer chamber 14, and is discharged into discharge conduit 22 via outlet opening 20. The discharge steam flows through the portion 22a of conduit 22 and is condensed by the cold water flowing upwardly in the portion 44a of water conduit 44. Air or other gases present in the water supplied by conduit 44 are vented from chamber 12 to atmosphere via opening 16 and vent 18. Impurities and condensate in the outer chamber 14 fall by gravity toward the bottom wall 26, and are collected in the drain trap 56 (which is periodically cleaned either manually or automatically). Owing to the arrangement of the frustoconical walls 4 and 6, the intermediate chamber 12 converges in the downward direction, whereby the back pressure of the vapor assists in causing the aforementioned flow of steam radially outwardly via the passages 30.

Although the walls 4, 6 and 8 have been illustrated and described as being generally cylindrical (whereby the chambers 12 and 14 are generally annular), it is apparent that the walls can have other suitable non-cylindrical configurations. While in accordance with the provisions of the patent statutes the preferred form and embodiment of the invention has been illustrated and described, it will be apparent to those skilled in the art that various changes may be made in the apparatus described without deviating from the invention set forth in the following claims.

What is claimed is:
1. Liquid heating apparatus, comprising
   a housing containing first, second and third concentrically-arranged generally cylindrical wall means defining a cylindrical inner chamber, an annular intermediate chamber arranged concentrically about said inner chamber, and an annular outer chamber arranged concentrically about said intermediate chamber, respectively, said chambers having a common vertical axis, said inner and intermediate chambers being in communication solely at their upper ends, said housewall means containing also an atmospheric vent opening communicating solely with the lower portion of said intermediate chamber, a vapor outlet opening communicating solely with the upper portion of said outer chamber, and generally radial passage means contained in said second wall means to afford communication between said outer chamber and the central portion of said intermediate chamber;
   means establishing a flow of hot gases upwardly from the lower portion of said inner chamber, radially outwardly into the upper portion of said intermediate chamber, and downwardly in said intermediate chamber toward said atmospheric vent opening; and
   means establishing in said intermediate chamber a downwardly directed annular spray curtain of liquid in interspersed relation with said hot gases for vaporization thereby, a radially outwardly flow of the resulting vapor through said radial passage means, and an upwardly directed annular vapor flow in said outer chamber toward said vapor outlet opening.

2. Apparatus as defined in claim 1, wherein said means establishing said hot gas flow comprises a burner mounted in the lower portion of said inner chamber, and means supplying fuel to said burner.

3. Apparatus as defined in claim 2 wherein said means establishing said liquid spray curtain comprises an annular water spray pipe arranged in the upper portion of said intermediate chamber, and a water supply conduit supplying water to said spray pipe; and further including a vapor discharge conduit communicating at one end with said vapor outlet opening, at least a first portion of said discharge conduit being in heat exchange relationship with said water supply conduit.

4. Apparatus as defined in claim 3 wherein said water supply conduit includes a horizontal portion adjacent the upper end of said intermediate chamber, and a vertical portion extending downwardly from said horizontal portion, said first portion of said vapor discharge conduit being in heat exchange relationship with said vertical portion.

5. Apparatus as defined in claim 4, and further including a condensation drain conduit affording communication between the lower portion of said outer chamber and the first portion of said vapor discharge conduit.

6. Apparatus as defined in claim 5 wherein the upper end of the first wall means terminates at a lower elevation than the upper end of the second wall means; wherein said housing includes also a downwardly divergent generally conical baffle arranged above, and spaced from the upper end of, said first wall means and said annular spray pipe, the outer diameter of the lower edge of said conical baffle wall being greater than the outer diameter of said first wall means and less than the inner diameter of said second wall means; and further wherein said means establishing said annular liquid spray curtain includes means for depositing said liquid upon the upper surface of said baffle.

7. Apparatus as defined in claim 2, wherein said radial passage means contained in said housing second wall means comprises at least one series of circumferentially spaced through passages arranged in a horizontal plane, and further including an upwardly-divergent truncated conical deflector mounted upon said wall means about said series of through passages to deflect upwardly the vapor flowing radially outwardly from said intermediate chamber.

8. Appaatus as defined in claim 1 wherein said second wall means comprises a frustoconical wall the upper end of which has a larger diameter than the lower end.

9. Apparatus as defined in claim 8 wherein said first wall means comprises a frustoconical wall the upper end of which has a smaller diameter than the lower end.

10. Apparatus as defined in claim 9 wherein the bottom wall of said intermediate chamber has a lower elevation than the bottom wall of said outer chamber.

References Cited

UNITED STATES PATENTS 1,527,740   2/1925   Lipshitz _____ 126—359

FREDERICK L. MATTESON, Jr., *Primary Examiner.*

R. A. DUA, *Assistant Examiner.*